Patented May 18, 1954

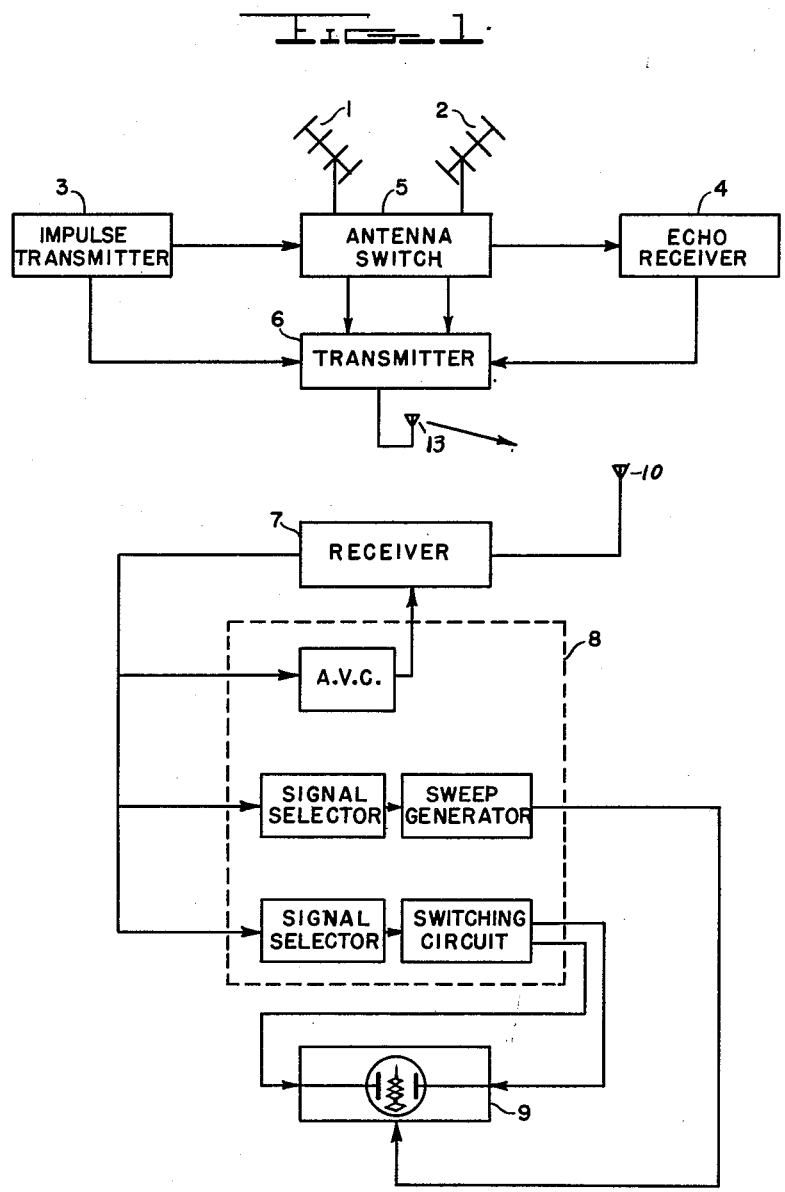

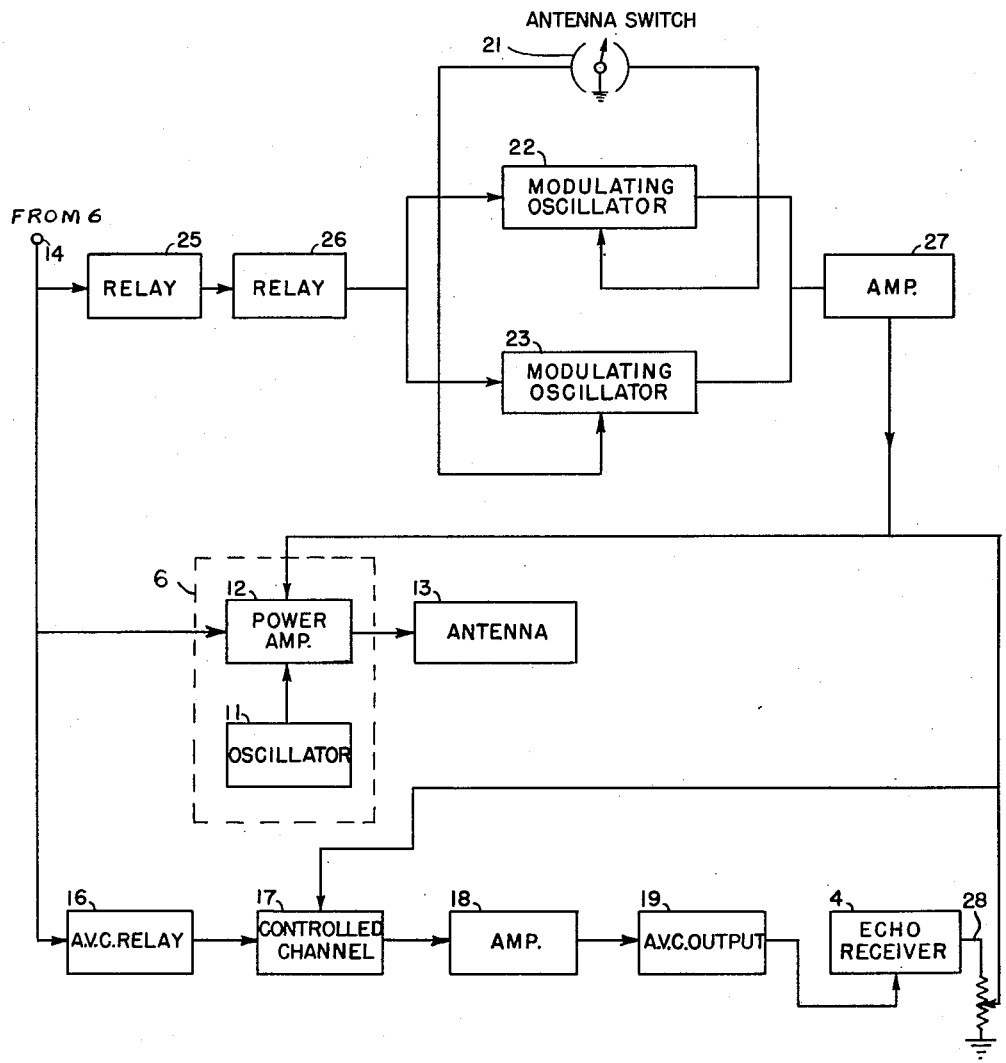

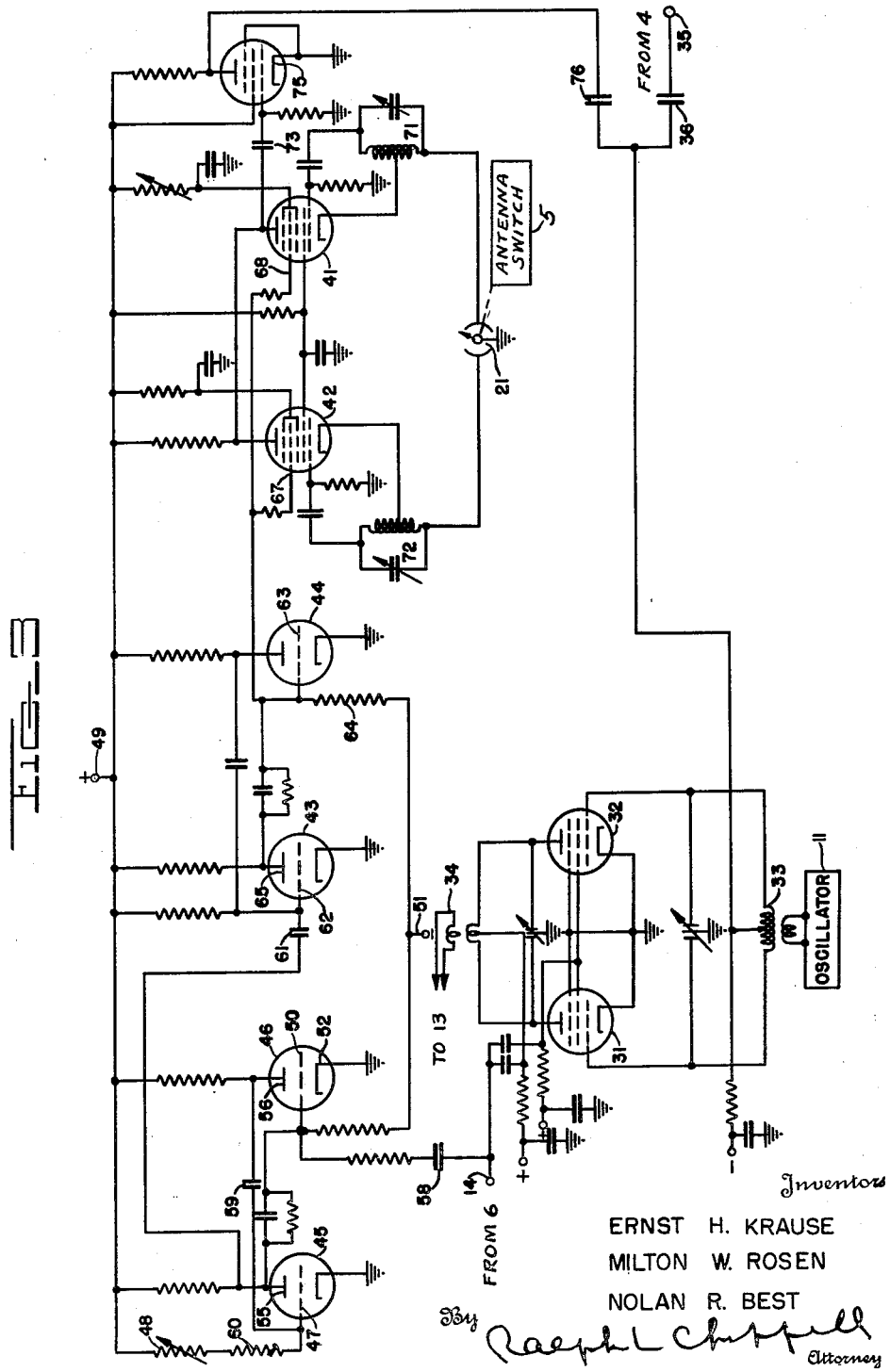

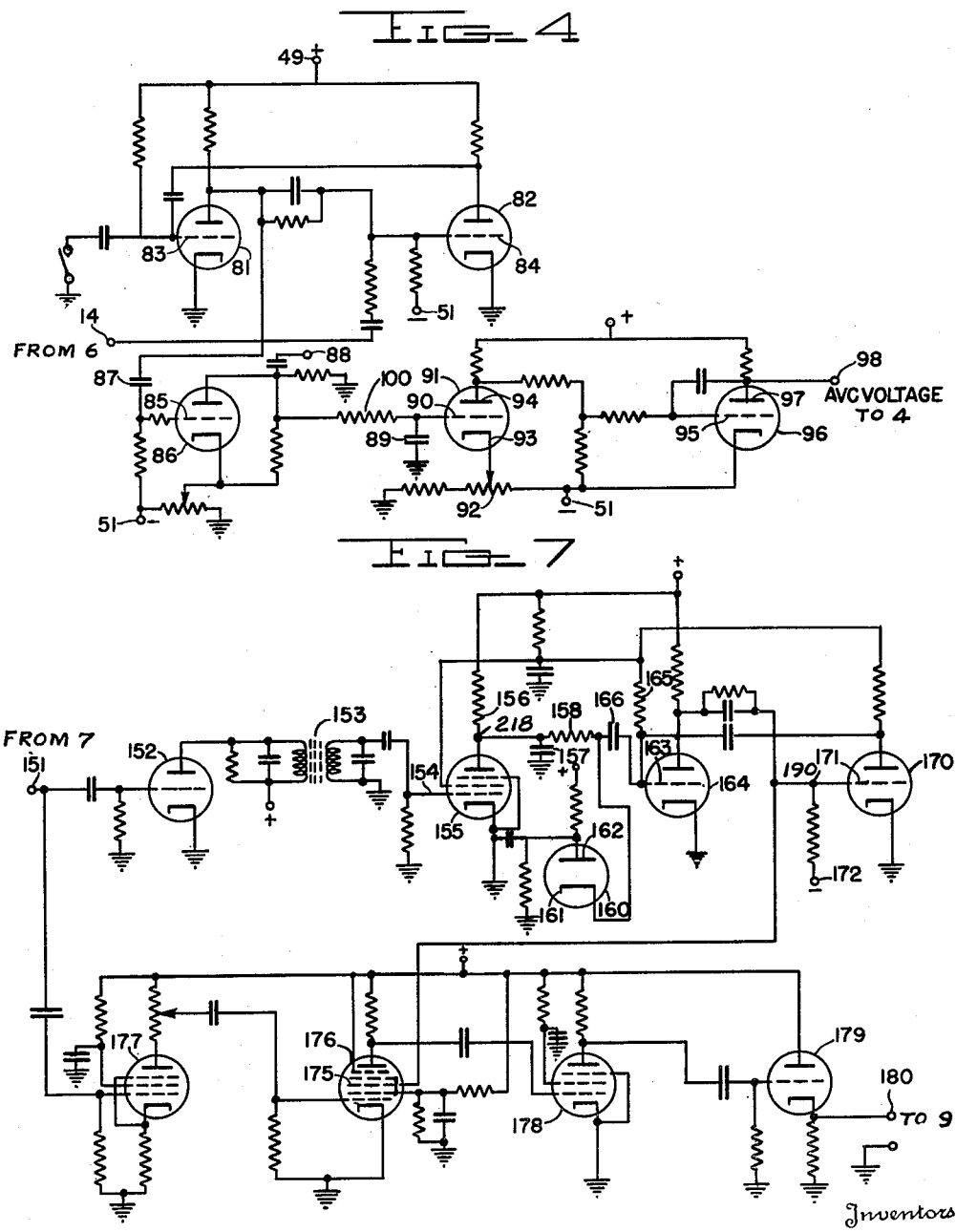

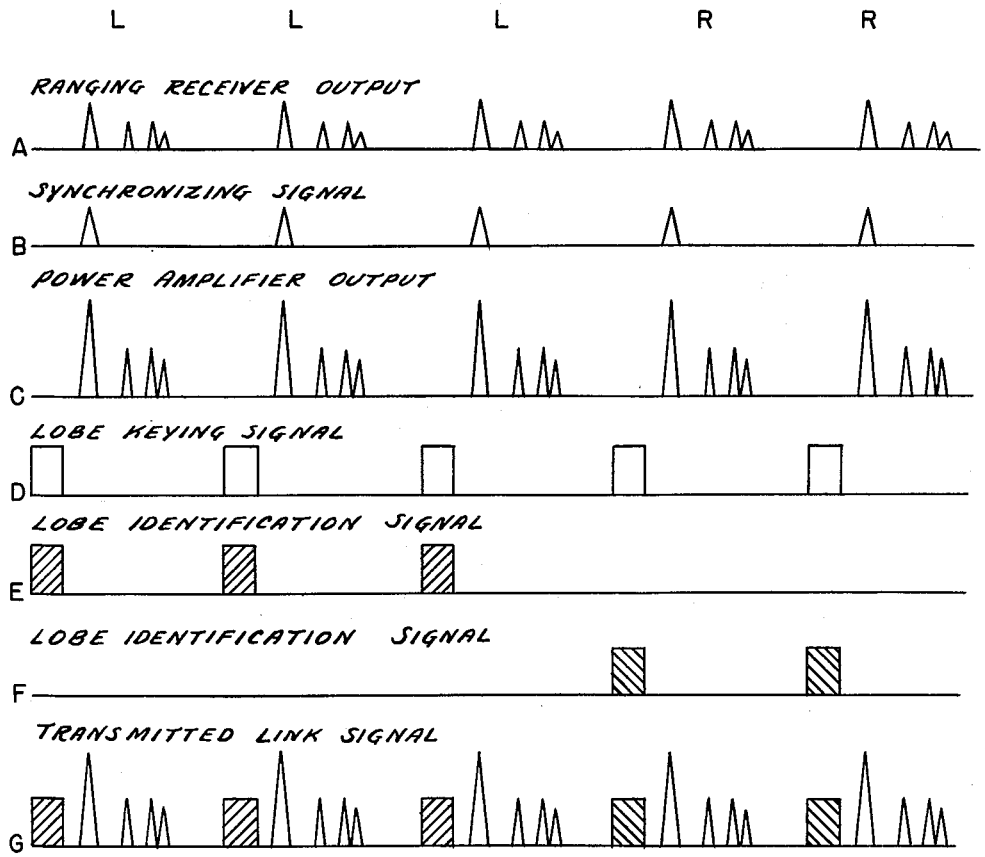

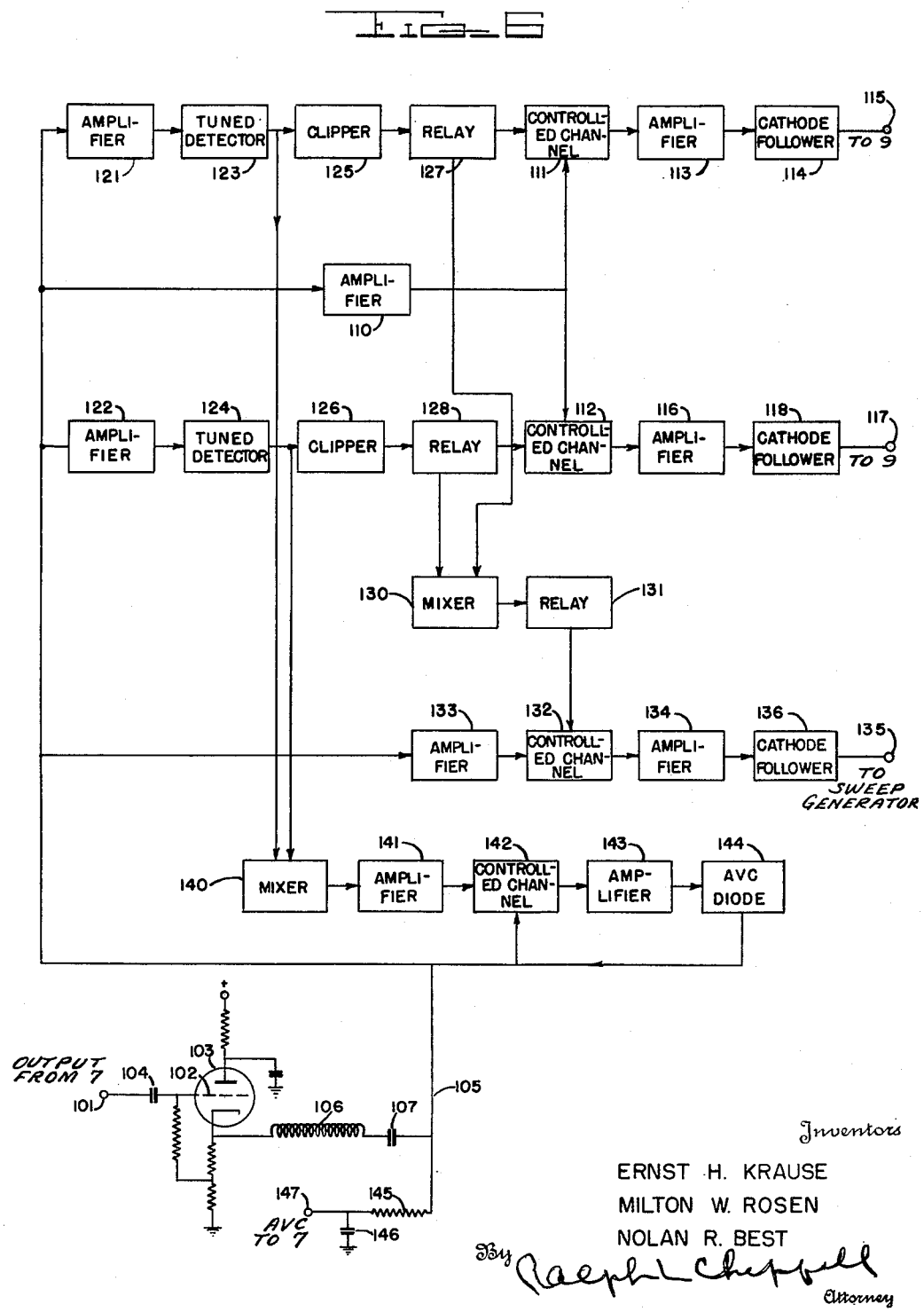

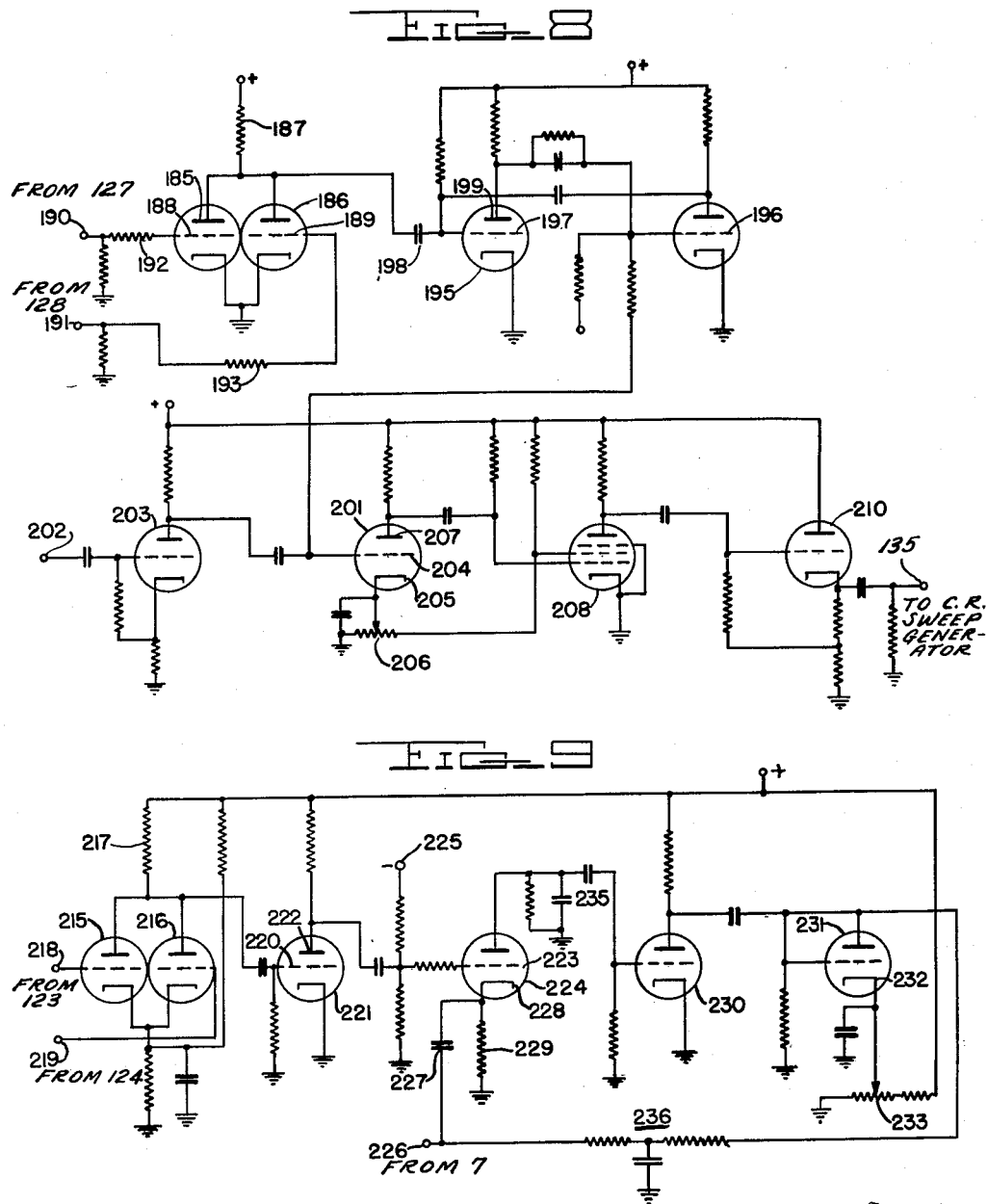

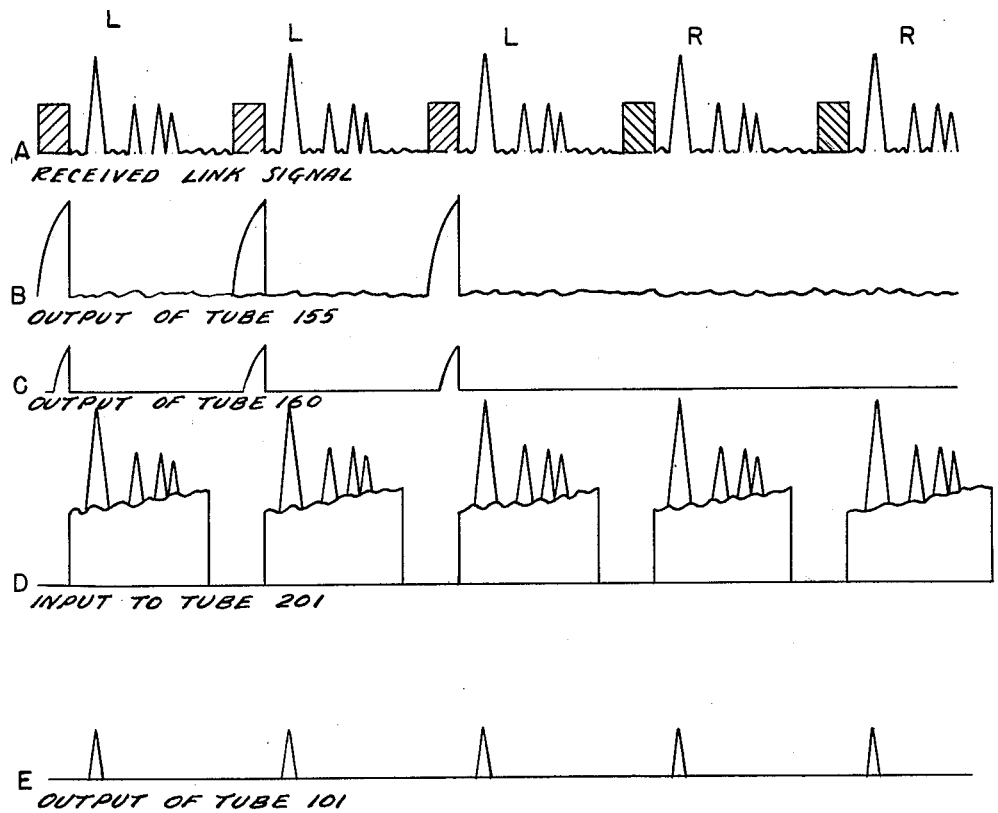

2,679,041

UNITED STATES PATENT OFFICE 2,679,041

REMOTE ECHO RANGING SYSTEM

Ernst H. Krause, Cheverly, Md., and Milton W. Rosen and Nolan R. Best, Washington, D. C.

Application October 10, 1945, Serial No. 621,637

19 Claims. (Cl. 343—6)

(Granted under Title 35, U. S. Code (1952), sec. 266)

This invention is directed to the problem of transmitting the information obtained from an echo ranging installation to a remote point.

In the use of echo ranging systems for obstacle detection, it is frequently desirable that the information obtained from the echo ranging system should be instantly available at a remote location. Thus, a central monitoring position may be provided for a multiplicity of echo ranging installation. Under other circumstances, it may be desirable to indicate remotely the detailed obstacle distribution in the immediate neighborhood of an echo ranging installation. This is particularly true where a mobile high resolution echo ranging system is employed to transmit information to a remote point, where the same information could not conveniently be obtained from an echo ranging installation at that point. The latter situation is particularly apt to arise in connection with mobile unattended craft.

It is accordingly the object of the invention to provide for the remote transmission of information obtained from an echo ranging system.

The invention will be further described with reference to the exemplary embodiment disclosed in the drawings, in which:

Figure 1 shows in block diagram an exemplary embodiment of the invention,

Figure 2 shows in block diagram a transmitter unit and associated keying circuits for transmitting the echo ranging information according to the present invention, Figure 3 shows a transmitter unit and associated keying circuits in schematic diagram for transmitting the echo ranging information according to the present invention, Figure 4 shows an automatic volume control system for the unattended echo ranging receiver, Figure 5 shows representative control and reception wave forms in the echo ranging installation, Figure 6 shows in block diagram a signal separator for employment with a receiver at a remote point from the echo ranging installation, Figure 7 shows a controlled amplifying channel in the signal separator of Figure 6, Figure 8 shows an indicator control circuit included in the signal separator shown in Figure 6, Figure 9 shows an automatic volume control system for use in the installation shown in Figure 6, Figure 10 shows representative wave forms at points in the signal separator of Figure 6.

The transmission system of the present invention is particularly adapted for operation with echo ranging systems employing radio impulse transmission and echo reception. The present invention is further adapted for employment with radio echo ranging system which yield information concerning the angular position or azimuth of an obstacle as well as the range thereof. In the specific embodiment to be described, the radio echo ranging system gives information additionally on the position of an obstacle with respect to which side of a reference direction it lies. The specific radio echo ranging system illustrated and described in the exemplary embodiment is similar to that disclosed in Patent No. 2,546,170 of George C. Schleter et al., filed December 7, 1942 for Radio Echo System for aircraft.

This system is diagrammatically disclosed in Figure 1, and in the following figures. It characteristically includes two antennas 1 and 2, having directive characteristics, disposed at an angle to one another. The mean direction of the antennas may be conveniently oriented with the longitudinal axis of the craft. The antennas are successively employed in the operation of the system, and by comparison of their respective echo amplitudes it may be ascertained to which side of the mean direction the obstacle being ranged upon is located. The system includes a periodically operative impulse transmitter 3 whose output is connected to the antenna system through switch 5.

It will be understood, particularly with reference to the above mentioned application, that the transmitter impulses are communicated by switch 5 to antenna 1 or antenna 2. The echos received on the respective antenna carrying the impulse are applied to receiver 4 and the output from this receiver is indicated on a cathode ray tube. Each antenna carries a series of transmitter impulses, following which the system is switched to the other antenna. The echoes are indicated in different positions on this tube for each antenna, and the echo amplitudes may be compared on the two indications. It may therefore be ascertained whether an obstacle is yielding a larger amplitude echo on antenna 1 or on antenna 2. The obstacle will yield the larger echo amplitude on the antenna with which it is more nearly aligned. By maneuvering the installation, or the vehicle on which it is applied, to obtain equal echo amplitudes from an obstacle, the mean direction of the antenna installation may be oriented toward that obstacle.

In the conventional echo ranging system, the information obtained thereon is normally locally indicated. This is also true in the system of the application above referred to. In the present system however, this information is not necessarily locally indicated, and indicating means for this purpose are not shown. The information obtained is, however, transmitted to a remote point from transmitter 6. This transmitter operates to relay the output of receiver 4 and is further controlled by suitable signals obtained from impulse transmitter 3 and from antenna switch 5.

The detailed operation of the transmitter and its associated circuits will be described in connection with subsequent figures of the drawing. The link transmitter output is received on antenna 10 by a remotely positioned link receiver 7, whose output is fed through a separator 8 which is selectively responsive to various signal components radiated by transmitter 6. The output of separator 8 is employed for controlling and applying the information to indicator 9, which is conventionally a cathode ray type of instrument.

The radio echo ranging system obtains information relative to the obstacle direction and range. This is applied as a composite signal to link transmitter 6. The signal components are separated in the output networks fed from remote receiver 7. Thus, one component is selectively transmitted through a selector network to operate the cathode ray tube sweep generator. Another series of components is passed to the indicator in a manner to characterize the direction of echo ranging. The separator 8 of Figure 1 is also shown to include an automatic volume control circuit of special construction which is effective in stabilizing the operation of the remote indication system.

As will be understood, it is necessary to transmit the amplitudes of the echoes received by receiver 4, their time relation with respect to the transmitter impulse, and also information relative to which antenna is operative at the time the respective echoes are received. Consequently the control circuits for the transmitter 6 are responsive to a synchronizing signal coinciding with the operation of the impulse transmitter, the radio echo signals derived from the transmitter impulse radiation, and a signal selectively characterized in dependency on whether antenna switch 5 is causing transmission from antenna 1 or antenna 2.

In the system above referred to, impulse transmitter 3 is operated a number of times during each cycle of the antenna switch 5. Thus, on successive series of transmitter operations, antennas 1 and 2 are alternately employed. The output signal of receiver 4 under this type of operation is shown at line A in Figure 5, where the left and right signal groups correspond to those obtained from antennas 1 and 2 respectively. The signal groups in line A correspond to the end of a left antenna series and the beginning of a right antenna series. The echo signals indicates three obstacles positioned along the mean antenna axis.

As shown in Figure 2 transmitter 6 may include an oscillator 11 driving a modulated power amplifier 12. The output of the power amplifier 12 may be radiated by any suitable antenna 13. The output of echo receiver 4, which may resemble the wave form shown at A in Figure 5, is directly modulated on the amplifier so that the time relations of the echo signals together with their amplitudes are transmitted.

In order to characterize the transmitter impulse so that this component of the echo receiver output may be selected without confusion with a high amplitude echo signal, a synchronizing signal obtained directly from impulse transmitter 3 is supplied at terminal 14 and is caused to additionally modulate power amplifier 12 simultaneously with this component which is received from the echo receiver. This synchronizing signal applied at terminal 14 is shown at line B in Figure 5, and causes the output of the power amplifier to have the wave form shown at line C in Figure 5. As may be seen the synchronizing signal has a considerably greater amplitude than that possessed by the echo signals.

For the purpose of the invention, it is particularly desirable that the maximum amplitude of an echo signal delivered from receiver 4 be maintained at a relatively constant voltage. For this purpose an automatic volume control system is provided, shown in Figure 2. In order that this system may respond only to the amplitude of the received echo, and will be independent of the transmitter impulse itself as delivered from receiver, it is operative only during a short period subsequent to the transmitter operation. For this purpose a relay 16 is provided operating in dependency on the transmitter synchronizing signal derived at terminal 14. The relay output provides a control signal for a limited period following the operation of the transmitter. Normally this time period will encompass the echo signal group which is received in consequence to a transmitter impulse. The relay signal is applied to a controlled channel 17, which receives the echo signal output and transmits the same to amplifier 18 during the duration of the relay output. Amplifier 18 feeds the AVC diode 19 whose output is employed to energize the AVC network of echo receiver 4.

The antenna lobe identification signal is obtained in dependency on operation of a component of the antenna switch. As shown at 21 in Figure 2 this switch will include two opposed contacts and a travelling brush member driven synchronously with the means controlling the antenna switching. On alternate antenna operation, the opposed switch elements are successively connected with ground as shown in the drawings. This antenna switch is employed to control selectively a pair of modulating oscillators of differing frequencies which are employed to apply a lobe identification signal to power amplifier 12. For this purpose oscillators 22 and 23 are provided. These oscillators may be conveniently controlled by connecting the oscillator tube cathodes to the opposed switch elements so that one or the other of the oscillators may be operated in accordance with the antenna selection.

The oscillators are keyed in dependency on the impulse transmitter synchronizing signal which is delivered to terminal 14. In order that the lobe identification signal may be transmitted without interference with the echo signal output, suitable time delay means are provided. As shown, this may constitute a pair of relays 25 and 26. Time delay relay 25 becomes operative in dependency on the transmitter synchronizing signal and after a selected period keys off relay 26. The latter relay is characterized in maintaining an output having a time duration equal to that during which it is desired to radiate a lobe identification signal. The output of relay 26 is shown at line D in Figure 5. As may be seen there, relay 26 is keyed into operation a period following the transmitter synchronizing impulse which is determined by the characteristic of relay 25, and that duration of the output of relay 26 is suitably proportioned to effect the proper identification signal.

As shown in line E which indicates the output of the modulating oscillator 22, the latter is keyed previously to each signal group corresponding to operation of left antenna 1. Oscillator 22 is operative during the alternate operations of antenna switch 21, in dependency on the operation of relay 26. As will also be seen from line F, Figure 5, operation of modulating oscillator 23, which characterizes the impulse signals derived from operation on right antenna 2, takes place during the succeeding period. It will be understood that the modulating oscillators 22 and 23 are designed to oscillate at different frequencies which are selectively responded to in the receiving system for synchronizing the desired sweep presentation. The output of the oscillators is applied through amplifier 27 to power amplifier 12, which is accordingly caused to radiate at antenna 13 the desired modulated lobe identifying signal.

The signal radiated by power amplifier 12 under the various signals introduced thereto is shown in line G in Figure 5. This signal comprises the preliminary lobe identification impulse, the high amplitude synchronizing signal derived upon operation of the impulse transmitter, and the echo receiver output following the same.

It is desirable that the two modulating oscillators 22 and 23 be adjusted to maintain equal amplitudes. It is also preferable for use with the receiving system to be further described below, that the maximum echo signal amplitude supplied by echo receiver 4 be equalized with the modulating oscillator output. For this purpose, voltage divider 28 is supplied.

Figure 3 shows in schematic diagram the power amplifier 12 together with modulating oscillators 22 and 23 and their control relays 25 and 26.

In this embodiment shown the power amplifier comprises pentode tubes 31 and 32, which are driven in push-pull relationship from oscillator 11. The amplifier may be amplitude modulated from the center tap of the grid tank coil 33. The plate tank circuit output is coupled inductively to coil 34 which is connected to a suitable transmission line for feeding antenna 13. The output of echo receiver 4 is supplied at terminal 35 as a positive voltage signal group and coupled to the amplifier for grid amplitude modulation through coupling condenser 36.

The transmitter synchronizing signal which is delivered directly to terminal 14 is coupled into the amplifier for simultaneous plate and screen grid modulation. Thus the signals introduced at terminals 35 and 14 establish operation of the amplifier to generate the signal shown at line C of Figure 5.

The operating conditions of the power amplifier including tubes 31 and 32 is such that normally a low CW output is maintained on the frequency of oscillator 11. The grid modulating signals effect substantially linear class A modulation, so that the echo amplitudes are modulated on the amplifier output in accordance with their relative strength. The simultaneous control grid, screen grid, and anode modulations effected in synchronism with the operation of the impulse transmitter drive the power amplifier to substantially twice the modulation amplitude which is effected by the lobe identification signals and maximum echo signals.

As pointed out above the lobe identification oscillators 22 and 23 are keyed into operation by relay 26, whose operation is instituted by time delay relay 25. The oscillators comprise tubes 41 and 42 respectively as shown in Figure 3. Keying relay 26 includes tubes 43 and 44, and time delay relay 25 includes tubes 45 and 46. The latter are conventional Kipp relays, having one stable condition, and being thrown over into the other condition by the injection of a synchronizing signal. The period of operation is determined by the RC time constant in the grid circuit of the tube conducting in stand-by.

In the time delay relay, grid 47 of tube 45 is returned through variable resistance 48 to a positive source of potential 49. Grid 50 of tube 46 is returned to a source of negative potential 51 by which its voltage is maintained below that of cathode 52 of tube 46. Consequently in relaxed condition this relay conducts in tube 45, whereas tube 46 is normally blocked. The potential at anode 55 of tube 46 is therefore well below that of the positive potential source 49, whereas anode 56 is normally at supply potential. The transmitter synchronizing impulse which is delivered to terminal 14 has a positive polarity and is introduced to grid 50 of tube 46 through condenser 58.

Upon operation of the impulse transmitter, tube 46 is therefore keyed into conduction and tube 45 is blocked. This condition is maintained during the interval determined by the time constant of the grid of tube 45, which is the product of the capacity 59 and the resistances in the grid circuit resistors 48 and 60. As shown in Figure 5 this interval is effective to produce the delay between the pip shown in line B which corresponds to the transmitter synchronizing impulses and the leading edge of the square wave signals shown in line D. Upon relaxation of this relay a negative voltage appears at anode 55 of tube 45, which is communicated through capacity 61 to grid 62 of tube 43.

Tubes 43 and 44 constitute the lobe identification synchronizing keying relay and are connected similarly to tubes 45 and 46. Grid 62 of tube 43 is returned to the positive potential source 49 and grid 63 of tube 44 is returned through series resistor 64 to a source of negative potential 51. Consequently tube 43 is normally conducting and tube 44 is normally non-conducting. Anode 65 of tube 43 maintains a low potential except when this tube is blocked.

Blocking of tube 43 is effected by the negative voltage applied to its grid upon relaxation of the time delay relay. The blocking period is determined by the time constant on grid 62 of tube 43. During this interval anode 65 of tube 43 is maintained positive and tube 44 is held in conduction through the resulting voltage applied to grid 63. It will be noted that the latter positive voltage shift is also applied simultaneously to grid 67 of tube 42 and grid 68 of tube 41. Consequently, tubes 41 and 42 are thereby thrown into a condition for conduction during conduction of tube 44.

The connection of grids 67 and 68 with grid 63 of tube 44 puts the antenna lobing identification tubes 41 and 42 under coordinate control with tube 44 of the keying relay. Consequently, the lobe identification oscillators may only be operated during the operative period of the keying relay.

As shown in Figure 3, the lobe identification oscillators comprise tank circuits 71 and 72 connected with the grid and cathode of tubes 41 and 42. The cathodes are returned to ground through switch 21 which is operated synchronously with the antenna switching means 5 of the ranging system. Consequently, under the control of the keying voltage from the keying relay and under control of antenna switch 21, tube 41 will supply the output shown at line F in Figure 5, and tube 42 will then supply the output shown at line E of Figure 5. The outputs of tubes 41 and 42 are obtained from their anode circuits, which are connected in parallel. This signal is applied through capacitor 73 to amplifying tube 75. The output of this tube is coupled through condenser 76 to the center tap of grid coil 33 of the power amplifier. The oscillator circuits of tubes 41 and 42 are adjusted to effect equal amplitude between the two oscillators. It will therefore be seen that suitable modulating signals are applied to the power amplifier to effect a modulation envelope as shown in line G of Figure 5.

The automatic volume control system for the radio echo receiver which is shown in block diagram in Figure 2 will be further described with reference to Figure 4. This circuit includes a relay having tubes 81 and 82, which is operative responsively to the impulse transmitter synchronizing signal delivered at terminal 14. Grid 83 of tube 81 is returned to the positive potential source 49 and grid 84 of tube 82 is maintained at a normally low potential by its return to negative potential source 51. Consequently, tube 81 is normally conducting and tube 82 is normally blocked. The relay is thrown over in response to the positive synchronizing signal introduced on grid 84 of tube 82. The time constant of the grid circuit of tube 81 is selected to effect relaxation of the relay after the receipt of the desired echo signal. During the operation of the relay a positive voltage is present on the anode of tube 81, which is fed to grid 85 of control tube 86 through condenser 87. Tube 86 comprises the controlled channel for the AVC circuit. This tube is normally blocked through the return of grid 85 to the negative potential source 51, and is non-conductive except during the limited operating period of the control relay. The echo receiver output is applied to the anode of tube 86 at terminal 88, whereby the tube operates as a diode responsive to the receiver output. The positive echo signals develop a negative voltage across capacitor 89 in accordance with their amplitude, and this voltage is applied to control grid 90 of tube 91.

The A. V. C. diode output circuit is responsive to the maximum echo signal amplitude due to the long time constant of resistance 100 and condenser 89. Tube 91 is a direct coupled amplifier which may be set to the desired operating condition by cathode voltage divider 92.

The average potential of grid 90 of tube 91 will therefore be maintained in accordance with the maximum amplitude of the echo signals received on the echo receiver. The anode 94 of this tube is direct coupled to grid 95 of tube 96. The anode 97 of the automatic volume control output tube 96 therefore supplies at terminal 98 an automatic volume control for reintroduction to the suitable intermediate amplifier grids of the radio echo receiver 4.

The A. V. C. components described, it will be understood, are desirable on unattended installations to prevent saturation in systems where directional indications are obtained through echo signal amplitude comparison.

Through the operation of this automatic volume control system, the output of echo receiver 4 is maintained so as to effect substantially constant maximum amplitude modulation of the power amplifier 12. Consequently, the receiver and indicator of the remote installation will be supplied with a stable signal.

Link receiver 7 shown in Figure 1 may be conventional and is therefore not shown in detailed circuit diagram. It may include a preliminary radio frequency amplifier stage, a converter, and a plurality of intermediate amplifier stages. The control grid of the amplifier stages may be returned to an automatic volume control connection which will be supplied with a suitable voltage by means to be described below. The intermediate amplifier output may be rectified, further amplified, and then connected to terminal 101, as shown in Figure 6.

In this figure is shown in block diagram the operating components and the operative connections between the same of the separator unit 7 shown in Figure 1. This unit functions to separate the alternate series of signal groups in accordance with the lobe identification signal, and to supply the transmitter and echo signals in two separate channels. The separator also includes components responsive to the transmitter synchronizing impulse which is of higher amplitude than the other signals of the signal group. Also shown in Figure 6 is an automatic volume control circuit for receiver 7.

The detected output of receiver 7, which is supplied at terminal 101, is coupled to grid 102 of tube 103 through capacity 104. Tube 103 is connected as a cathode follower whose output is supplied to bus 105 through radio frequency choke coil 106 and capacity 107.

The receiver output signal which is present at bus 105 is delivered to amplifier 110 which feeds two controlled channels 111 and 112. The output of channel 111 is fed to amplifier 113 which is coupled through cathode follower 114 to the left indicator channel terminal 115. Channel 112 feeds amplifier 116 which is coupled to output channel 117 through cathode follower 118. Transmission of channels 111 and 112 is selectively controlled in dependency on the lobe identification signals.

For this purpose the receiver output is fed through amplifiers 121 and 122 to a pair of tuned detectors 123 and 124. These detectors are selectively responsive to the lobe identifications signal frequencies. The two detector outputs are fed through base clippers 125 and 126 for the purpose of removing low level noise. The detector outputs are effective at the end of the lobe identification signals to throw into operation relay 127 or 128. The relay outputs are effective to permit transmission through the controlled channels during a sufficient time period to accommodate the transmitter synchronizing impulse and the received echoes.

By the operation of the above circuit, the successive echo signals are fed through the alternate indication channels. The indicator sweep circuit, however, is required to respond to each of the signal groups. For this purpose the output of relays 127 and 128 are both fed to mixer 130. The output of this mixer is operative at the end of each lobe identification signal to key into operation relay 131. Relay 131 is provided with a limited operating period which is sufficient to encompass the receipt of the transmitter synchronizing impulse. This impulse signal is presented to controlled channel 132 by amplifier 133 fed from the receiver bus 105. Channel 132 is over-biased to an extent sufficient to reject all signals except the synchronizing impulse which, as described above may be of substantially twice the echo and lobe identification signal amplitude. Controlled channel 132 is maintained biased so as to be totally inoperative except in response to operation of relay 131. Consequently, the output of controlled channel 132 consists of a single impulse appearing at the pulse repetition frequency of the radio echo ranging system, and this is fed to amplifier 134, which is coupled to the synchronizing signal channel 135 through a cathode follower stage 136.

The automatic volume control system for receiver 7 is responsive only to the lobe identification signal amplitudes. As described in connection with the transmitting system, this is substantially equal to the maximum amplitude of a received signal pulse. The AVC system includes mixer 140 which is responsive to the output of both tuned detectors 123 and 124. Mixer 140 feeds an amplifier 141 which operates on a controlled channel 142 to permit the passage of the lobe identification signal from the receiving set. The lobe identification signal is fed through the amplifier 143 to an automatic volume control diode of a conventional type 144. The diode output is connected directly to bus 195 which is therefore supplied with direct current potential providing the receiver automatic volume control voltage. This voltage is filtered through series resistor 145 and condenser 146 to supply the desired potential of terminal 147 for connection to the receiver automatic control bus.

The lobe identification signal controlled transmission channels, which feed the indicator units, are identical to each other, with the exception of the resonant frequency of the tuned detectors 123 and 124. For this reason only one channel will be described in detail, and this is shown in an exemplary embodiment of Figure 7 in the drawings.

The receiver output signal may be introduced at terminal 151 in Figure 7. The signal is fed through amplifying tube 152. This amplifier is coupled through a tuned transformer 153 to control grid 154 of tube 155. Tube 155 constitutes a detector which is responsive only to the appropriate lobe identification signal frequency. In order to discriminate against interference and transient noise levels the plate circuit of tube 155 is provided with series resistor 156 and shunt condenser 157. These components are selected to have a long time constant, which is substantially equal to the duration of the lobe identification signal. Consequently, as the lobe identification signal may be made to last several hundred microseconds, the anode circuit of this tube will be relatively unresponsive to short noise impulses.

In order further to discriminate against low level noise the output circuit of tube 155 is provided with a base clipping diode 160. Diode 160 functions as a base clipper for removing low level signals and noise. The tube is normally conductive, and is in series with resistor 158 in the output circuit of tube 155. When the output value rises above a limiting value, cathode 161 assumes a potential above anode 162 and as the diode is then non-conducting, the higher level signals are applied to control grid 163 of tube 164.

The operation of the circuit described will be further clarified with reference to Figure 10 which shows representative wave forms present therein. As in Figure 5, the end of a left lobe series and the beginning of a right lobe series of signals is shown. At A the receiver output signal appears which is presented to the grid of tube 152. At B is shown the output wave form on the anode of tube 155. It will be noted that the anode of this tube is responding only to the left series of echo signal groups which correspond to the particular lobe identification signals to which this detector stage is resonant. At C is shown the signal after clipping by diode 160, the low level noise variation being substantially eliminated therefrom.

This clipped signal is differentiated across resistor 165 in the grid circuit of tube 164 through condenser 166. This furnishes a sharp negative voltage pip at the end of the lobe identification signal.

Tubes 164 and 170 are coupled in a relay circuit in which tube 164 is maintained normally conducting through the return of its control grid to a positive potential. The control grid 171 of tube 170 is returned to a negative potential 172 so that this tube is normally cut off. The sharp negative impulse delivered at grid 163 of tube 164 on termination of the wave form at C of Figure 10 blocks tube 164 to throw tube 170 into conduction by the positive voltage thereby applied to grid 171 of this tube.

Grid 175 of tube 176 is controlled simultaneously with grid 171 of tube 170. Tube 176 is thus maintained in conduction during the conducting period of tube 170, which period is determined by the time constant of the grid circuit of tube 164. This interval is selected to encompass the transmitter synchronizing impulse and the received echo signal group.

Tube 176 is fed the receiver output from amplifier tube 177. The output of tube 176 is further amplified in tube 178 and coupled to output channel 180 through cathode follower tube 179. Channel 180 will be connected with one of the deflection input circuits of cathode ray indicator 9 shown in Figure 1.

In Figure 8 the circuit disclosed selects the high amplitude transmitter synchronizing signal which is required for triggering the receiver sweep circuit.

This circuit comprises a pair of mixer tubes 185 and 186 arranged with a common anode resistor 187. Control grids 188 and 189 are fed respectively from terminals 190 and 191 and may be directly energized from relays 127 and 128 which are shown in Figure 6. Specifically, these terminals may be connected to grid 171 of tube 170 shown in Figure 7 and to the corresponding element in the other channel, so that one or the other mixer tube is conductive following each lobe identification signal. This produces a resultant negative voltage swing across resistor 187.

The negative anode swing of tubes 185 and 186 is employed to control relay 131 which comprises tubes 195 and 196. In the circuit shown, tube 195 is biased so as to be normally conducting and tube 196 is biased to be normally blocked. The negative voltage supplied at the output of the mixer on the termination of each lobe identification signal is coupled to the control grid 197 of tube 195 through capacity 198 to block this tube substantially during the time constant of the grid circuit. This causes a positive swing on anode 199 in tube 195 to drive tube 196 into conduction and simultaneously open a controlled channel including tube 201.

In order to supply the receiver output to tube 201, the receiver may be connected to terminal 202 for introducing the signal to amplifying tube 203. The receiver output is therefore applied to control grid 204 of tube 201 along with the positive output from tube 199 which follows the termination of the lobe identification signal. Cathode 205 of tube 201 is biased positive on voltage divider 206 to maintain tube 201 non-conducting except on the high amplitude transmitter synchronizing signal. Consequently, anode 207 of tube 201 is maintained substantially at positive supply potential except during this synchronizing impulse. The resulting negative swing on anode 207 is inverted in amplifier tube 208 and is coupled to output terminal 135 through cathode follower 219. The positive pulse on terminal 135 is employed for tripping the sweep generator in the indicator unit.

In Figure 10 line D is shown the signal applied to control grid 204 of tube 201, which is a combination of the receiver output signal and the gating control voltage from the relay 131. On line E of Figure 10 is shown the amplified output from tube 201 from which all the signal has been eliminated except the synchronizing impulses which trigger the sweep circuit.

The automatic volume control system for receiver 7 is shown in Figure 9, and is responsive only to the lobe identification signals. The circuit comprises a pair of tubes 215 and 216 which are provided with a common anode resistor 217. These tubes are provided with a positive cathode bias to clip low level noise. The control grids of the mixer tubes may be connected at terminal 218 and 219 directly to the anodes of the detectors. Thus, terminal 218 in Figure 9 may be directly connected to the anode of tube 155 in Figure 7. The detector anode signal being a positive voltage, anodes of tube 215 and 216 swing negative during the lobe identification signals, and this signal is applied to grid 220 of tube 221. This permits anode 222 of tube 221 to swing positive during the lobe identification signal. This positive swing is communicated to grid 223 of tube 224 which is normally biased below a conducting level by the grid return to a source of negative voltage at terminal 225.

The receiver output voltage is applied at terminal 226 and is coupled to cathode 228 through condenser 227. Cathode 228 is returned to ground through a relatively high impedance 229. Tube 224 acts as a diode detector during the lobe identification signals while the blocking potential is removed from grid 223.

The detected output voltage is filtered to remove the lobe identification modulating frequency components by condenser 235, and then amplified and inverted in tube 230. In the figure, the diode is constituted by a tube in which the grid and plate are electrically connected together to form a unipotential conductive surface acting as the anode in respect to the cathode. The positive output signal therefrom is applied to an AVC diode 231. The latter tube effects delayed automatic volume control through the positive bias applied to its cathode which is returned to voltage divider 233. The negative output of the AVC network is applied to terminal 226 and bus 105 of Figure 6 through R.-C. filter 236. The time constant of resistor 145 and condenser 146 shown in the latter figure is sufficient to average over the lobe shifting cycle so that the relative pulse echo amplitudes of the respective directional indications will be maintained.

It will be understood that the embodiment described is exemplary of the invention, the scope whereof is to be ascertained by reference to the appended claims.

The invention described herein may be manufactured and used by or for the government of the United States of America for governmental purposes without the payment of any royalties thereon or therefor.

What is claimed is:

1. In combination, an echo ranging system having an impulse transmitter and an echo receiver, a radio transmitter comprising vacuum tube means having control and anode electrode means, means operative to apply the receiver output to the control electrode means, and means operative to apply a power impulse to the anode electrode means during impulse transmitter operation.

2. In combination, an echo ranging system including a recurrent impulse generator, means for transmitting the impulses in different directions, and an echo receiver; a signal transmission circuit responsive to the receiver output, and modulation control means for the signal circuit operative in dependency on the echo ranging system to transmit a synchronized impulse signal characterizing each direction of impulse transmission.

3. In combination, an echo ranging system including a recurrent impulse generator, means for transmitting the impulses in different directions, and an echo receiver; a unipolar signal transmission circuit responsive to the receiver output, and modulation control means for the signal circuit operative in dependency on the echo ranging system to transmit a frequency signal characterizing the direction of impulse transmission.

4. In combination, an echo ranging system including a recurrent impulse generator, means for transmitting the impulses in different directions, and an echo receiver; a unipolar signal transmission circuit responsive to the receiver output, and modulation control means for the signal circuit operative in dependency on the impulse transmitting means to transmit a synchronized signal characterizing the direction of impulse transmission.

5. In combination, an echo ranging system having a recurrent impulse generator, means for transmitting the impulses in either of two directions, and an echo receiver; a unipolar signal transmission circuit responsive to the receiver output, and modulation control means for the signal circuit operative in dependency on the echo ranging system to transmit a synchronized signal characterizing the direction of impulse transmission.

6. In combination, an echo ranging system having a recurrent impulse generator, means for transmitting the impulses in either of two directions, and an echo receiver; a unipolar signal transmission circuit responsive to the receiver output, and modulation control means for the signal circuit operative in dependency on the echo ranging system to transmit a frequency signal characterizing the direction of impulse transmission.

7. In combination, an echo ranging system having a recurrent impulse generator, means for transmitting the impulses in either of two directions, and an echo receiver; a unipolar signal transmission circuit responsive to the receiver output, and modulation control means for the signal circuit operative in dependency on the impulse transmitting means to transmit a signal characterizing the direction of impulse transmission.

8. In combination, an echo ranging system having an impulse generator recurrently operative at a repetition frequency, means for transmitting the impulses in different directions, and an echo receiver; a signal transmission circuit responsive to the receiver output, and modulation control means for the signal circuit operative in dependency on the echo ranging system to transmit a signal unipolar therewith characterizing the impulse transmission direction preceding impulse generator operation.

9. In combination, an echo ranging system having an impulse generator recurrently operative at a repetition frequency, means for transmitting the impulses in different directions, and an echo receiver; a signal transmission circuit responsive to the receiver output, and modulation control means for the signal circuit operative in dependency on the echo ranging system to transmit a frequency signal unipolar therewith characterizing the impulse transmission direction preceding impulse generator operation.

10. In combination, an echo ranging system having a recurrent impulse generator, means for transmitting the impulses in different directions, and an echo receiver; a radio transmitter responsive to the receiver, and unipolar modulation control means for the radio transmitter operative in dependency on the echo ranging system to transmit a synchronized signal characterizing the direction of impulse transmission.

11. In combination, an echo ranging system having a recurrent impulse generator, means for transmitting the impulses in different directions, and an echo receiver; a radio transmitter responsive to the receiver, and unipolar modulation control means for the radio transmitter operative in dependency on the echo ranging system to transmit a frequency signal characterizing the direction of impulse transmission.

12. In combination, an echo ranging system having a recurrent impulse generator, means for transmitting the impulses in either of two directions, and an echo receiver; a pulse radio transmitter, two oscillators of different frequency, and means for causing the oscillators to modulate the radio transmitter selectively in accordance with the direction of impulse transmission.

13. In combination, an echo ranging system having a recurrent impulse generator, an echo receiver, and a pair of directive impulse radiators; a unipolar radio pulse transmitter, responsive to the echo receiver output, a pair of modulating oscillators, and switching means recurrently operative to connect the impulse generator selectively to one and then to the other radiator, and to modulate the radio transmitter accordingly selectively with one and then the other modulating oscillator.

14. In combination, an echo ranging system having a recurrent impulse generator, an echo receiver, and a pair of directional impulse radiators; a unipolar radio pulse generator responsive to the echo receiver output, a pair of modulating oscillators, switching means recurrently operative to connect the impulse generator selectively to one and then to the other radiator and to permit operation of one and then of the other modulating oscillator, and means responsive to impulse generator operation becoming operative after a time delay period to key the modulating oscillator selected by the switching means to modulate the radio transmitter.

15. In combination, an echo ranging system having a recurrent impulse generator, an echo receiver, and a pair of directional impulse radiators; a unipolar radio pulse transmitter responsive to the echo receiver output, a pair of modulating oscillators, switching means recurrently operative to connect the impulse generator selectively to one and then to the other radiator and to permit operation of one and then of the other modulating oscillators, keying means operative to cause oscillation of the modulating oscillators during a predetermined time period, and time delay means becoming operative responsively to the operation of the impulse generator after a timing period to institute operation of the keying means.

16. A receiver for a recurrent signal comprising an identifying component and a subsequent signal group, having a plurality of normally nonconducting receiver output channels, and means selectively responsive to the identifying component to render only one of said output channels conductive during a predetermined time period for delivery of the subsequent signal group.

17. In combination, a receiver for a cyclically recurring signal each cycle of which comprises an identifying component of characteristic frequency, a high amplitude impulse, and a succeeding signal group; a cathode ray tube, and operating means for the cathode ray tube responsive to the receiver output to indicate the succeeding signal group along a timing locus inaugurated responsively to the high amplitude impulse in a position determined in dependency on the frequency of the identifying signal.

18. In combination, a receiver for a recurrent signal comprising an identifying component, a synchronizing impulse, and a signal group; a cathode ray tube sweep generating means for said tube operative to establish a timing locus thereon in dependency on the receiver output synchronizing impulse, and control means for said tube selectively responsive to the identifying component to indicate the signal group characteristically in accordance therewith on the timing locus.

19. In combination, an echo ranging system operative to sound in a plurality of directions, a signal transmitter, transmitter control means therefore responsive to the echo ranging system operation to transmit a synchronized signal identifying the direction of sounding and signals corresponding to echoes received, a remote receiver responsive to the signal transmitter signals, indicator means fed by the receiver, and operating means for the indicator operative responsively to the receiver to represent the echo sginals in a position determined responsively to the direction identification signal.

References Cited in the file of this patent

UNITED STATES PATENTS

| Number | Name | Date |
| --- | --- | --- |
| 2,199,634 | Koch | May 7, 1940 |
| 2,252,083 | Luck | Aug. 12, 1941 |
| 2,405,930 | Goldberg et al. | Aug. 13, 1946 |
| 2,407,198 | Wolff | Sept. 3, 1946 |
| 2,409,456 | Tolson et al. | Oct. 15, 1946 |
| 2,412,669 | Bedford | Dec. 17, 1946 |
| 2,412,702 | Wolff | Dec. 17, 1946 |
| 2,426,654 | White | Sept. 2, 1947 |
| 2,427,029 | Stearns | Sept. 9, 1947 |
| 2,464,258 | Prichard | Mar. 15, 1949 |
| 2,493,774 | Moore | Jan. 10, 1950 |
| 2,495,690 | Bradley | Jan. 31, 1950 |
| 2,514,351 | Smith | July 4, 1950 |
| 2,519,935 | Smith et al. | Aug. 22, 1950 |
| 2,546,170 | Schleter et al. | Mar. 27, 1951 |
| 2,547,945 | Jenks | Apr. 10, 1951 |
| 2,552,172 | Hawes | May 8, 1951 |